US009771169B2

(12) United States Patent
Dahl et al.

(10) Patent No.: US 9,771,169 B2
(45) Date of Patent: Sep. 26, 2017

(54) PRECONDITIONED AIR UNIT WITH VARIABLE FREQUENCY DRIVING

(75) Inventors: Soren Risgaard Dahl, Odense (DK); Bo Vork Nielsen, Morud (DK); Henrik Olsson, Odense (DK); Lars Schroder, Assens (DK)

(73) Assignee: AXA POWER APS, Odense N (DK)

( * ) Notice: Subject to any disclaimer, the term of this patent is extended or adjusted under 35 U.S.C. 154(b) by 1359 days.

(21) Appl. No.: 13/257,669

(22) PCT Filed: Mar. 18, 2010

(86) PCT No.: PCT/IB2010/051189
§ 371 (c)(1),
(2), (4) Date: Sep. 20, 2011

(87) PCT Pub. No.: WO2010/106520
PCT Pub. Date: Sep. 23, 2010

(65) Prior Publication Data
US 2012/0023985 A1    Feb. 2, 2012

(30) Foreign Application Priority Data
Mar. 20, 2009    (DK) ................ 2009 00392

(51) Int. Cl.
*F25B 1/00*     (2006.01)
*F25D 15/00*    (2006.01)
(Continued)

(52) U.S. Cl.
CPC ............... *B64F 1/362* (2013.01); *Y02T 50/82* (2013.01)

(58) Field of Classification Search
CPC .......... B64F 1/362; G05D 23/19; Y02T 50/82
(Continued)

(56) References Cited

U.S. PATENT DOCUMENTS 3,784,888 A * 1/1974 Geiersbach et al. ...... 318/400.01
4,272,967 A * 6/1981 White et al. ................ 62/236
(Continued)

FOREIGN PATENT DOCUMENTS

EP    0431563 A2    6/1991
GB    2150278 A     6/1985
(Continued)

OTHER PUBLICATIONS

"Understanding of Variable Speed Drives (Part 2)", 1999, Solomon S. Turkel, Electrical Construction and Maintenance.*
(Continued)

*Primary Examiner* — Henry Crenshaw
(74) *Attorney, Agent, or Firm* — Hauptman Ham, LLP

(57) ABSTRACT

A preconditioned air unit for supplying preconditioned air to an aircraft parked on the ground, the preconditioned air unit comprising a housing accommodating a flow duct with an air inlet for ambient air and an air outlet for connection to the parked aircraft, a blower connected with the flow duct for generation of an air flow from the air inlet toward the air outlet, at least one refrigeration system, each of which includes at least one compressor, at least one condenser, at least one expansion valve, and at least one evaporator connected in a flow circuit containing a refrigerant, and wherein the at least one evaporator interacts with the air flow in the flow duct, and at least one variable frequency driver for power supply of at least one of the at least one compressor of the at least one refrigeration system.

22 Claims, 9 Drawing Sheets

(51) Int. Cl.
*F25D 19/00* (2006.01)
*F25D 17/02* (2006.01)
*B64F 1/36* (2017.01)

(58) Field of Classification Search
USPC .............................. 62/228.4, 236, 298, 434
See application file for complete search history.

(56) References Cited

U.S. PATENT DOCUMENTS

| | | | | |
|---|---|---|---|---|
| 4,514,991 | A * | 5/1985 | Zinsmeyer | 62/209 |
| 4,691,155 | A * | 9/1987 | Taylor et al. | 318/771 |
| 4,859,924 | A * | 8/1989 | Chonan | 318/808 |
| 5,107,685 | A * | 4/1992 | Kobayashi | 62/115 |
| 6,240,742 | B1 | 6/2001 | Kaufman et al. | |
| 6,414,455 | B1 * | 7/2002 | Watson | F04B 47/02 318/432 |
| 6,446,447 | B1 * | 9/2002 | Goth et al. | 62/176.1 |
| 6,600,278 | B1 * | 7/2003 | Bretzius | 318/34 |
| 6,751,979 | B2 * | 6/2004 | Leathers | 62/401 |
| 7,479,749 | B2 * | 1/2009 | Gerding et al. | 318/469 |
| 7,685,838 | B2 * | 3/2010 | Hutton | 62/434 |
| 2006/0086124 | A1 * | 4/2006 | Sellers | 62/298 |
| 2007/0035263 | A1 * | 2/2007 | Rastogi et al. | 318/432 |
| 2008/0141703 | A1 * | 6/2008 | Bean, Jr. | 62/434 |
| 2008/0250903 | A1 | 10/2008 | Hsieh | |
| 2008/0314064 | A1 * | 12/2008 | Al-Eidan | 62/324.6 |
| 2009/0084120 | A1 * | 4/2009 | Meier et al. | 62/129 |
| 2010/0031676 | A1 * | 2/2010 | Urbain | 62/89 |

FOREIGN PATENT DOCUMENTS

| | | |
|---|---|---|
| JP | 63-73897 A | 4/1988 |
| JP | 63-238382 A | 10/1988 |
| JP | 03-273927 A | 12/1991 |
| JP | 0549903 B2 | 7/1993 |
| JP | 08-156580 A | 6/1996 |
| JP | 10257796 A | 9/1998 |
| JP | 3190397 B2 | 7/2001 |
| JP | 4119761 B2 | 7/2008 |
| WO | 2007061622 A1 | 5/2007 |
| WO | 2007135103 A2 | 11/2007 |

OTHER PUBLICATIONS

Understanding variable speed drives part 3, Apr. 1995, "Motor Drive", Solomn S Turkel.*
Search Report results for Danish Patent Application No. PA 2009 00392 dated Nov. 3, 2009.
ISR for PCT/IB2010/051189 dated Jan. 11, 2011.

* cited by examiner

PRECONDITIONED AIR UNIT WITH VARIABLE FREQUENCY DRIVING

RELATED APPLICATIONS

The present application is national phase of PCT/IB2010/051189 filed on Mar. 18, 2010 and claims priority from Danish Application Number PA 2009 00392 filed Mar. 20, 2009.

BACKGROUND

The present invention related to a preconditioned air unit supplying preconditioned air, i.e. heated air or cooled air, to an aircraft parked on the ground.

On the ground, an aircraft typically uses the auxiliary power unit engine (APU) to drive air-conditioning equipment to cool or heat the aircraft cabin to a temperature that is comfortable for passengers. However, operation of the APU has a high cost in terms of jet fuel consumption, generated acoustic noise, $CO_2$ emissions, etc. For example, the APU of an A320 aircraft consumes app. 160 l fuel per hour. In addition to the general air pollution, the consumption of one liter of jet fuel leads to emission of 2.5 kg $CO_2$ into the atmosphere and thus, the APU emits app. 400 kg $CO_2$ per operational hour.

In order to avoid running the APU on the ground, preconditioned air units have been provided for supplying the required preconditioned air to the parked aircraft. The preconditioned air units are powered from the mains supply made available at the airport in question.

Cost, efficiency, flexibility, and serviceability remain an issue in known preconditioned air units.

SUMMARY OF THE INVENTION

A new preconditioned air unit is provided for supplying preconditioned air to an aircraft parked on the ground. The new preconditioned air unit has a housing with walls defining a flow duct with an air inlet for intake of ambient air to be conditioned to a low temperature, typically a temperature in the range from −5.degree. C. to +5.degree. C., and an air outlet for connection to the parked aircraft, e.g. with one or more hoses, for supplying the conditioned air to the parked aircraft. To prevent cooling losses, the outer walls of the flow duct may be provided with a layer of heat insulation material.

The preconditioned air unit further comprises a blower accommodated in the housing and connected with the flow duct for generation of an air flow from the air inlet toward the air outlet. The blower is preferably a highly efficient centrifugal fan. The blower is preferably mounted with vibration dampers and attached with flexible connections to the flow duct.

The new preconditioned air unit further comprises at least one refrigeration system, each of which comprises at least one compressor, at least one condenser, at least one expansion valve, and at least one evaporator connected in a refrigerant flow circuit containing a refrigerant.

At least one compressor of the at least one refrigeration system may be powered from a variable frequency driver. In a conventional preconditioned air unit, the compressor is supplied from the mains supply, i.e. with an AC voltage of 50 Hz in Europe and 60 Hz in USA. Thus, the maximum capacity of the compressor is determined by the frequency of the mains supply. Advantageously, the output voltage and frequency of the variable frequency driver in the new preconditioned air unit are varied to control the at least one compressor in accordance with the current cooling requirement. Preferably, the variable frequency driver keeps the ratio between the output voltage and the frequency substantially constant to maintain a high motor torque throughout the entire output frequency range. In this way, each of the at least one refrigeration systems may operate continuously, i.e. the output voltage and frequency of the variable frequency driver may be adjusted to levels required by the at least one compressor in order for it to cool the airflow interacting with the respective at least one evaporator in accordance with a control setting. This increases the life time and decreases power consumption of the at least one refrigeration system as compared to conventional on/off control.

Further, the maximum capacity of a compressor driven by a variable frequency driver may be increased as compared to the same compressor supplied directly from the mains supply. For example, supplying a compressor with a supply voltage with a 75 Hz output frequency increases the cooling capacity of the compressor by 50% over the same compressor supplied directly from the mains supply in Europe.

Preferably, the controller of the variable frequency driver (in the following denoted "VFD-controller") is capable of controlling the variable frequency driver to output a variable output frequency, e.g. ranging from 0 Hz to the maximum rating of the compressor whereby the one or more compressors supplied from the variable frequency driver may be controlled for provision of variable cooling capacity, e.g. in response to the temperature and flow rate of the air flow in the flow duct.

A plurality of variable frequency drivers may be provided for power supply of respective compressors, e.g. each of the compressors may be powered from a separate variable frequency driver that may individually control and possibly adjust the cooling capacity of the respective compressor.

Each variable frequency driver may be located in any suitable position in the housing suitably connected for power supply of the required one or more compressors.

The preconditioned air unit may further comprise at least one condenser fan for generation of a condenser airflow interacting with the at least one condenser of the at least one refrigeration system thereby increasing the heat removal capacity of the at least one condenser.

Each of the at least one condenser fan may be located in any suitable position in the housing for provision of a condenser air flow within the housing. Each of the at least one condenser fan may be located adjacent an air outlet in the housing for generation of a condenser air flow out through the outlet, and each of the at least one condenser may be located adjacent an air inlet for interaction with the generated condenser airflow at ambient temperature. Obviously, the direction of the condenser air flow may be reversed although in this case the condenser air flow may be heated by internal components within the housing before interacting with the at least one condenser.

At least one of the at least one condenser fan may be powered from a variable frequency driver. In a conventional preconditioned air unit, the condenser fan is supplied from the mains supply, i.e. with an AC voltage of 50 Hz in Europe and 60 Hz in USA, and thus, the condenser fan performance is locked to the frequency of the mains supply. Advantageously, the VFD controller is capable of varying the output voltage and frequency of the variable frequency driver in order to control the at least one condenser fan in accordance with the current operational requirements, such as current pressure within the at least one condenser, efficiency, etc.

Preferably, the variable frequency driver keeps the ratio between the output voltage and the frequency substantially constant to maintain a high motor torque throughout the entire output frequency range. The output frequency may range from 0 Hz to the maximum rated frequency of the at least one condenser fan. A plurality of variable frequency drivers may be provided for power supply of respective condenser fans, e.g. each of the condenser fans may be powered from a separate variable frequency driver that may individually control and possibly adjust the cooling capacity of the respective condenser fan by control of the condenser air flow rate generated by the condenser fan.

Each variable frequency driver may be located in any suitable position in the housing suitably connected for power supply of the required one or more condenser fans.

The preconditioned air unit may further comprise a variable frequency driver connected for electrical power supply of the blower. Advantageously, the VFD controller is capable of varying the output voltage and frequency of the variable frequency driver in order to control the blower in accordance with the current operational requirements, primarily the amount of air allowed to be received in the type of aircraft currently connected to preconditioned air unit. Preferably, the variable frequency driver keeps the ratio between the output voltage and the frequency substantially constant to maintain a high motor torque throughout the entire output frequency range. The output frequency may range from 0 Hz to the maximum rated frequency of the blower.

The new preconditioned air unit may comprise a main unit and one or more self-contained cooling modules mounted in the main unit. The main unit includes the housing having a plurality of compartments for receiving and holding the self-contained cooling modules. Each of the self-contained cooling modules comprises at least one of the at least one refrigeration systems.

Each of the at least one refrigeration system operates in accordance with well-known refrigerator principles and with a well-known refrigerant, such as R134a with low global warming potential.

The at least one evaporator of the at least one refrigeration system is mounted in the housing of the preconditioned air unit for interaction with the airflow in the flow duct for cooling of the air flow. For example, a cooling surface of the at least one evaporator may be positioned inside the flow duct for direct contact across a large surface area with the airflow in the flow duct.

One or more VFD-controllers of the at least one refrigeration system may further perform data collection of parameter values sensed by sensors of the at least one refrigeration system, e.g. temperature sensors sensing temperatures in the airflow upstream and downstream of the at least one evaporator and of the at least one condenser, pressure sensors sensing the pressure of the refrigerant in the at least one refrigeration system, etc.

Preferably, the preconditioned air unit has a central controller that is configured for controlling the operation of the preconditioned air unit. The central controller may be connected to a user interface for reception of user commands from a user and for outputting messages to the user. The preconditioned air unit may comprise at least one of the following: A user interface panel with input keys and a display, a remote control, a computer interface, a network interface, a loudspeaker, etc. For example, one of the primary user entries specifies the type of aircraft to be supplied by the preconditioned air unit. This information may be entered using entry keys of the user panel, or, using a remote control from the passenger boarding bridge, or, may be transmitted from the building management system of the airport, etc.

The central controller may further be connected with some or all of the VFD-controllers of the preconditioned air unit for individual control of the VFD-controllers. For example, if the preconditioned air unit comprises a plurality of refrigeration systems, the central controller may output an individual temperature setting to the VFD-controllers of each of the refrigeration systems, and, in response to the individual temperature setting, each of the VFD-controllers controls the cooling capacity of the respective at least one compressor to adjust the temperature of the airflow having interacted with the corresponding at least one evaporator as required.

Further, each of the refrigeration systems may be configured for failure detection so that, in the event that one of the refrigeration systems fails, the failing cooling refrigeration system may transmit a failure signal to the central controller and may shut down if required. In response to the failure signal, the central controller may operate to automatically adjust the required amount of cooling among the remaining properly operating refrigeration systems of the preconditioned air unit.

The central controller may be interfaced with some or all of the VFD-controllers and possibly other controlled devices, such as an SCR module controlling a heater in the flow duct, with a data and control bus, such as the CAN bus.

The preconditioned air unit may further have a rectifier connected to the mains supply input of the preconditioned air unit for generation of a power DC voltage supply for supplying the variable frequency drivers.

In order to suppress distortion and pollution of the mains supply, the rectifier circuit may comprise a 12-pulse rectifier, or a 18-pulse rectifier, or a 24-pulse rectifier, etc.

The preconditioned air unit may share a mains power outlet with other equipment at the parked aircraft, such as, a ground power unit, a cable coil, vehicle chargers, etc. In order to lower the peak power requirement of the shared mains power outlet, the preconditioned air unit may comprise a power sharing control input for control of preconditioned air unit power consumption. The power sharing control input may for example be operated to lower the preconditioned air unit power consumption during high load operation of the ground power unit, e.g. by lowering the cooling capacity provided by the preconditioned air unit when the ground power unit draws a high supply current. The ground power unit typically only operates at maximum load during a short period of time before push back from the gate until it is disconnected from the air craft at which point in time the aircraft's own air conditioning system takes over. Before then, the passenger cabin of the aircraft has already been cooled for some time and thus, again, lowering the cooling capacity for a short period of time before push back does not seriously diminish the overall performance of the preconditioned air unit. In general, lowering the cooling capacity for short periods of time does not seriously diminish the overall performance of the preconditioned air unit.

The preconditioned air unit may be mounted underneath or on top of a passenger boarding bridge and move freely with bridge actuation. Alternatively, the preconditioned air unit may be provided with pedestal legs for flexibility in preconditioned air unit location at an apron or in a hangar.

A plurality of the new preconditioned air units may be interconnected for supplying preconditioned air to a parked aircraft in cooperation. Two of the new preconditioned air units may for example be coupled in parallel in a master-slave configuration wherein the outputs of each of the preconditioned air units supply a common hose that is connected to the parked aircraft and possibly split at the aircraft into two or more hoses for supplying possible individual inputs of the aircraft for preconditioned air. The master may control the slave in such a way that the two preconditioned air units deliver substantially the same amounts of preconditioned air at substantially the same temperature to the parked aircraft. Other control principles may also be applied. For example, the CAN-bus of the cooperating preconditioned air units may be inter-connected for flexibility of control sharing between cooperating units.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DESCRIPTION

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
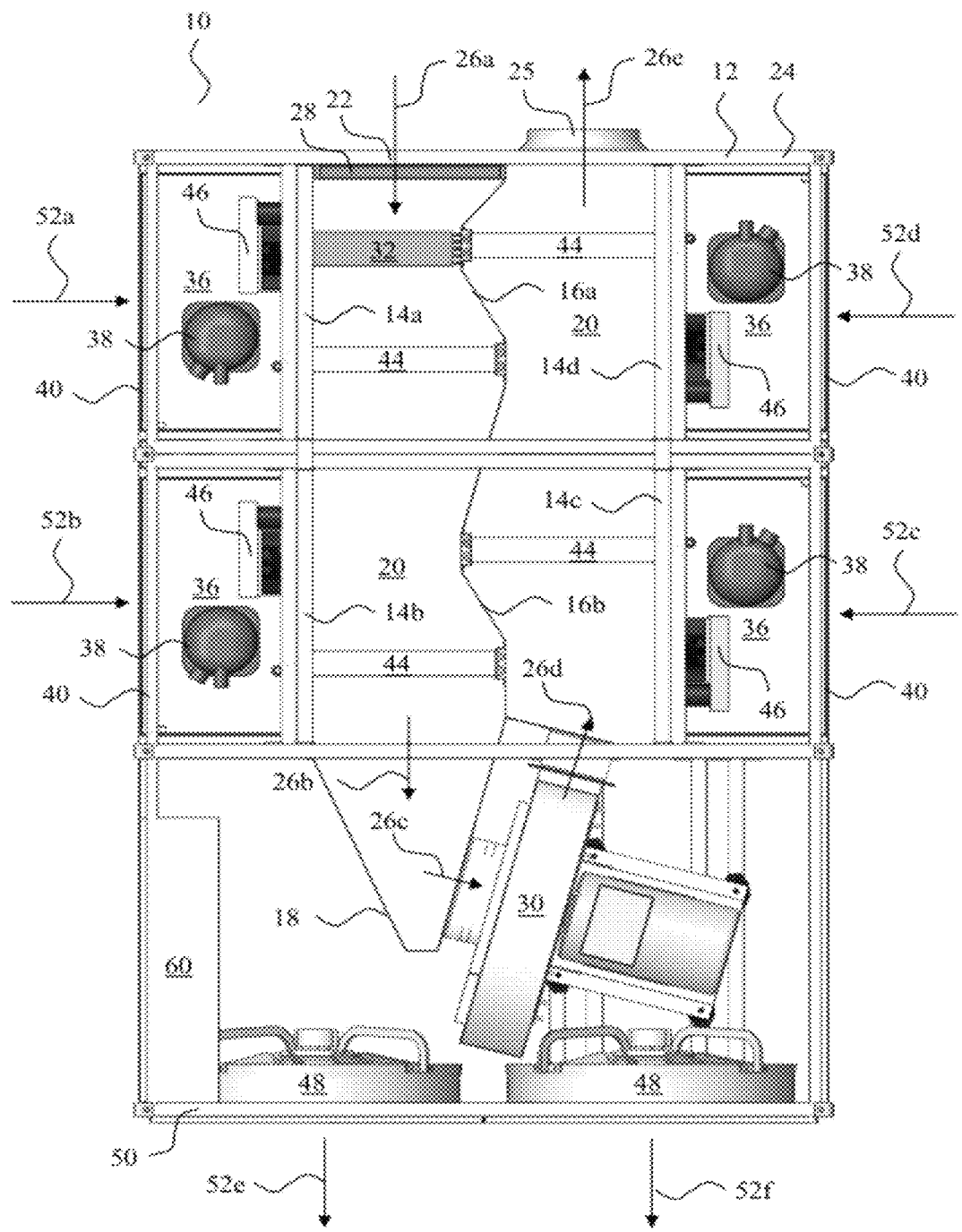
FIG. 1 shows a preconditioned air unit from above with the top removed.

FIG. 1 shows a top view of an exemplified embodiment of the new preconditioned air unit 10 for supplying preconditioned air to an aircraft parked on the ground. The preconditioned air unit 10 has a main unit with a housing 12 with walls 14a, 14b, 14c, 14d, 16a, 16b, 18, besides top and bottom walls (not shown) defining a flow duct 20. Ambient air enters the flow duct 20 through an air inlet 22 in a side wall 24 of the housing 12. The flow duct 20 is folded inside the housing 12 so that walls 16a, 16b separate the flow duct into two parts with air flowing in opposite directions during operation of the preconditioned air unit 10. The side wall also has an air outlet 25 for connection to the parked aircraft, e.g. with one or more hoses, for supplying the conditioned air to the parked aircraft. The direction of the air flow is illustrated by arrows 26a, 26b, 26c, 26d, 26e. Air is aspirated through an easily replaceable filter 28 that is mounted across the air inlet 22. To prevent cooling losses, the outer walls 14a, 14b, 14c, 14d, and the top wall of the flow duct are provided with a 50 mm thick layer of heat insulation material. At the bottom of the flow duct, heat insulation is provided underneath a plate (not shown) for collection of condensate.

A blower 30 is connected with the flow duct 20 for generation of the required air flow from the air inlet 22 toward the air outlet 25. In the illustrated preconditioned air unit 10, the blower 30 is a highly efficient centrifugal fan. The blower 30 is mounted with vibration dampers and attached with flexible connections to the flow duct 20. The flow duct 20 is dimensioned for low air speed in order to prevent free moist carry-over.

An optional heater 32 is mounted in the flow duct 20 allowing the preconditioned air unit 10 to heat ambient air in case of low ambient air temperatures.

Figure 2:
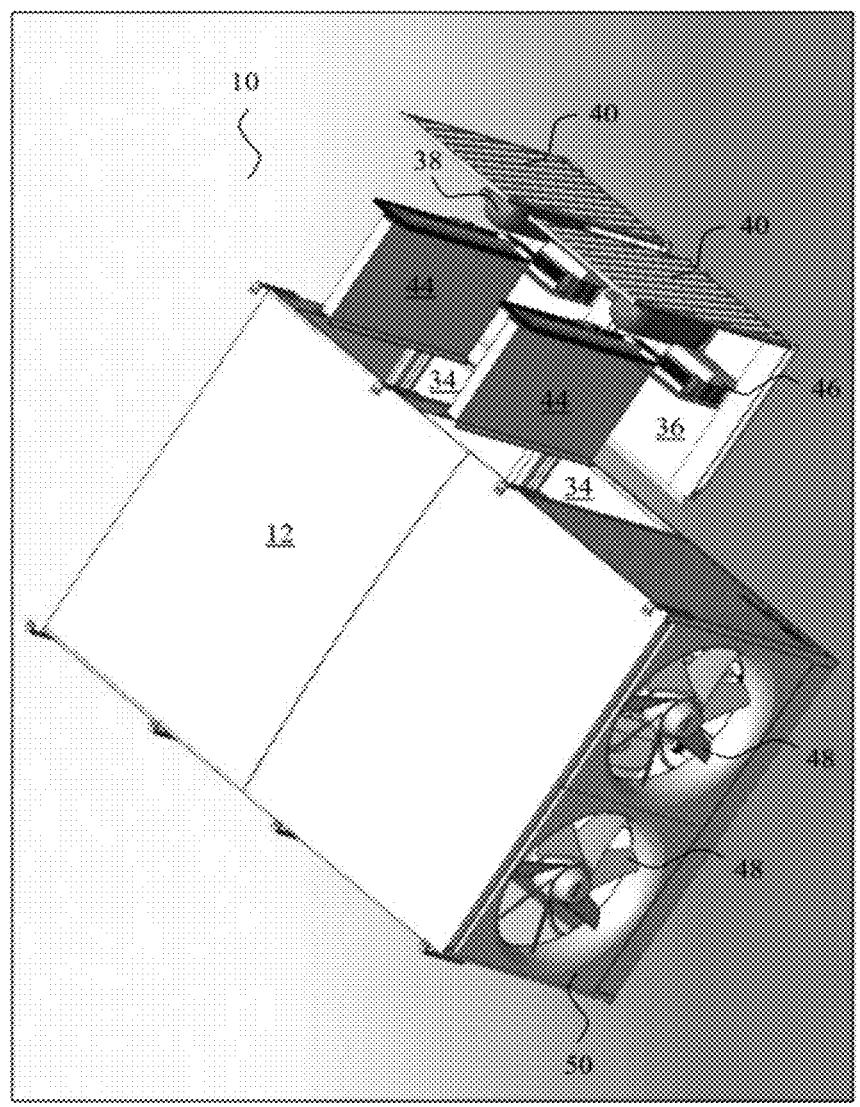
FIG. 2 shows a preconditioned air unit in perspective with two self-contained cooling modules withdrawn from their respective compartments.

As most clearly shown in FIG. 2, the illustrated preconditioned air unit 10 has four similar compartments 34 for receiving and holding four respective, identical self-contained cooling modules 36.

Figure 3:
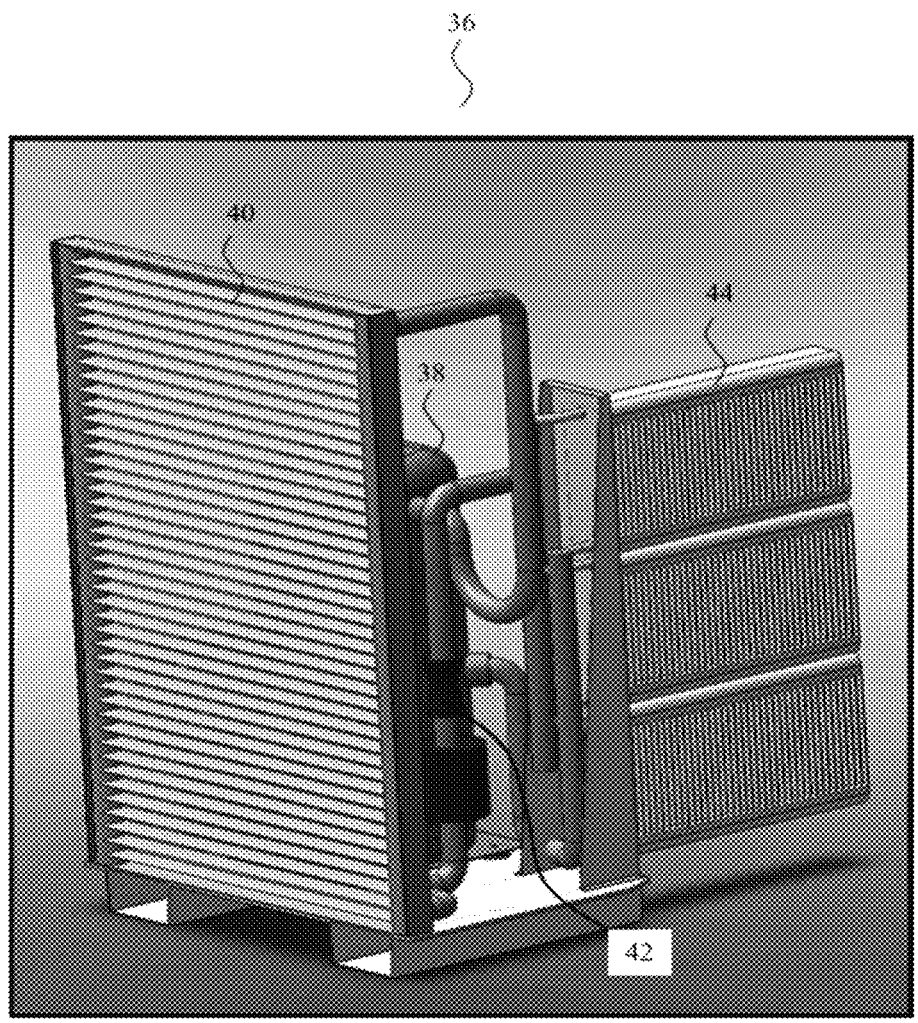
FIG. 3 shows a self-contained cooling module in perspective.

As shown in FIG. 3, each of the self-contained cooling modules 36 comprises a refrigeration system including a compressor 38, a condenser 40, an expansion valve 42, and an evaporator 44 connected in series in a refrigerant flow circuit containing a refrigerant selected in accordance with the expected high end ambient temperature of the airport in question, e.g. R134a selected for operation at high end ambient temperatures around 40.degree. C. The refrigerant flow circuit forms a closed and sealed loop. Each of the self-contained cooling modules 36 operates in accordance with well-known refrigerator principles.

Each of the self-contained cooling modules 36 can be installed in the housing 12 of the main unit without interfering with the refrigeration system of the module 36 so that assembly and possible disassembly of self-contained cooling modules 36 in the preconditioned air unit housing 12 can be performed by persons without specific skills in the field of refrigeration systems. The self-contained cooling modules 36 may be manufactured at one site particularly suitable for manufacturing of refrigeration systems for subsequent integration with housings 12 of the main unit at a separate site particularly suitable for manufacturing of airport ground equipment in general thereby increasing manufacturing flexibility and decreasing manufacturing cost of the preconditioned air unit 10. Further, the self-contained cooling module 36 may be stored as a spare part including the refrigerant, whereby repair of a preconditioned air unit without having to perform the cumbersome task of emptying the preconditioned air unit for refrigerant is made possible.

The power supply, control circuitry, and user interface of the preconditioned air unit 10 allows the preconditioned air unit 10 to operate with any number of self-contained cooling modules 36 installed, i.e. the illustrated preconditioned air unit 10 may operate with a single self-contained cooling module 36 installed in an arbitrarily selected compartment 34; or, with two self-contained cooling modules 36 installed in respective arbitrarily selected compartments 34; or, with three self-contained cooling modules 36 installed in respective arbitrarily selected compartments 34; or with four self-contained cooling modules 36 installed in respective compartments 34. In this way, a product line of preconditioned air units 10 is provided making four different preconditioned air units 10 available with different cooling capacities based on the same components. This lowers manufacturing cost by lowering purchase cost per component, and storage and handling cost both per component and per finished preconditioned air unit 10. Further, a preconditioned air unit 10 already in use in an airport with less than four self-contained cooling modules 36 installed may be upgraded on site by installing one or more self-contained cooling modules 36 in empty compartments 34.

Preferably, the self-contained cooling modules 36 are removably installed in the housing 12 of the main unit facilitating separation of an installed self-contained cooling module from the housing 12, e.g. utilizing screws, nuts and bolts for fastening each of the self-contained cooling modules 36 to the housing 12 and utilizing electrical connectors (not shown) to establish the required electrical interconnections between the cooling module and the housing 12 when the cooling module 36 is inserted in the housing 12 of the main unit 10.

Figure 5:
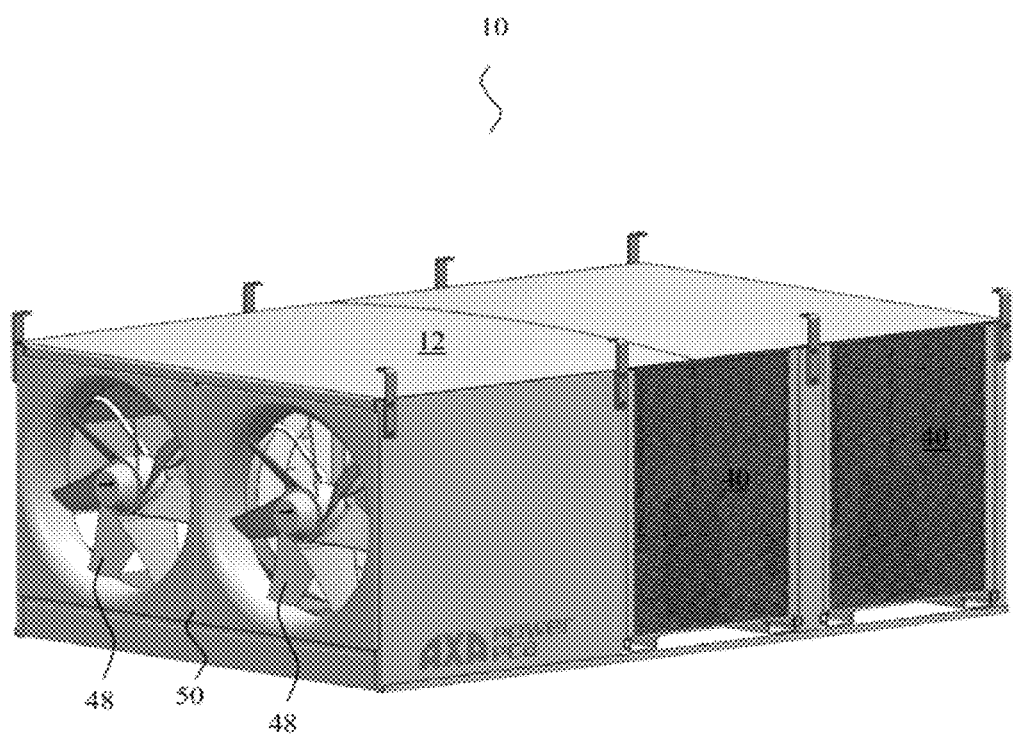
FIG. 5 shows a preconditioned air unit in perspective ready for mounting.

FIG. 2 shows in perspective the preconditioned air unit of FIG. 1 with two self-contained cooling modules 36 withdrawn from the housing 12 of the main unit 10. FIG. 5 shows in perspective the preconditioned air unit of FIGS. 1 and 2 with the two self-contained cooling modules 36 inserted and installed in the housing 12 of the main unit 10.

Figure 4:
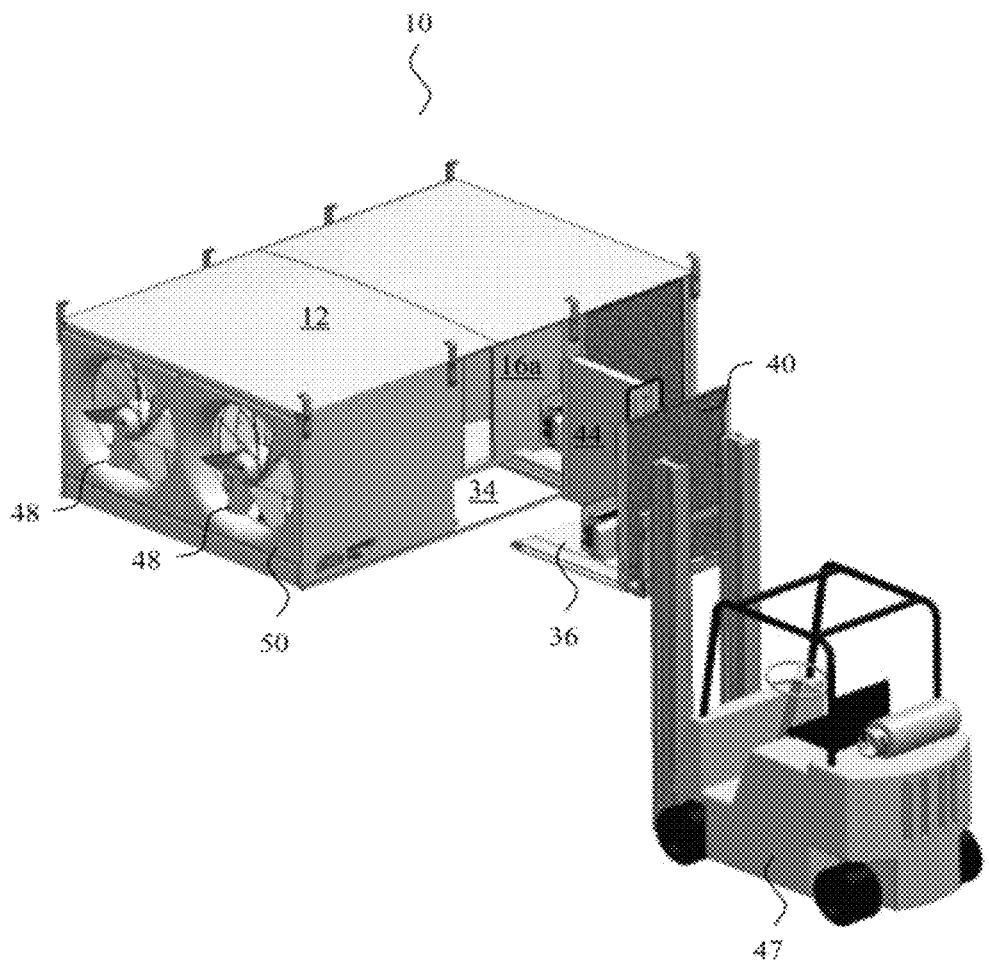
FIG. 4 illustrates handling of a self-contained cooling module with a fork lift truck.

The removability of the modules 36 enhances the serviceability of the preconditioned air unit 10 since a possible malfunctioning self-contained cooling module can be separated from the housing 12 of the main unit 10 and replaced with a functioning module 36 with a minimum of down time of the preconditioned air unit 10. One cooling module 36 can be replaced in approximately 20 minutes. In the event that a functioning cooling module 36 is not available for substitution of the malfunctioning cooling module 36, the preconditioned air unit 10 will continue operation with the remaining cooling modules 36, i.e. the preconditioned air unit 10 remains fully operational, however with a lowered cooling capacity. Further, the malfunctioning module 36 can be moved for repair at a separate site particularly suitable for repair of refrigeration systems. Also, the possible requirement of dismounting and moving the entire preconditioned air unit for repair of a cooling circuit is hereby reduced. Preferably, the self-contained cooling module 36 has physical dimensions suitable for movement by a fork lift truck 47 as illustrated in FIG. 4 facilitating transportation of the module 36, e.g. for storage, assembly into a preconditioned air unit 10, and service. For example, a malfunctioning module 36 can be removed from the housing 12 with a fork lift truck 47 and a properly functioning module 36 can be installed in the housing 12 with a fork lift truck 47.

In the illustrated preconditioned air unit 10, the evaporator 44 of each self-contained cooling module 36 is positioned inside the flow duct 20 through a slot in the wall 14a, 14b, 14c, 14d when installed in the housing 12 of the main unit for optimum heat exchange with the air flow in the duct 20. The evaporator 44 has a large number of channels for passage of the air flow in the duct 20 providing a large surface of heat exchange between the air flow and the refrigerant flowing inside the evaporator 44 as is well-known in the art of refrigeration systems. The slots in the walls 14a, 14b, 14c, 14d are sealed when the respective self-contained cooling modules 36 are mounted in their operational positions in the compartments 34. In absence of a self-contained cooling module 36, the slot is sealed with a cover plate.

Cooling in multiple steps as provided by a plurality of self-contained cooling modules 36 efficiently condenses the air humidity and protects the last downstream evaporator 44 from freezing over. A stainless steel condensate pan (not shown) and integrated condensate pump (not shown) ensure that the condensation moisture is removed in a controlled way.

The cooling air leaves the illustrated preconditioned air unit through one or two 14" hoses.

Each of the compressors 38 of the self-contained cooling modules 36 may be powered from a variable frequency driver 46 also located in the respective self-contained cooling module 36. In a conventional preconditioned air unit, the compressor is supplied from the mains supply, i.e. with an AC voltage of 50 Hz in Europe and 60 Hz in USA. Thus, the capacity of the compressor is limited by the frequency of the mains supply. This limitation does not exist in the new preconditioned air unit 10. Advantageously, the variable frequency driver the VFD-controller is capable of varying the output voltage and frequency of the variable frequency driver 46 in order to control the compressor 38 in accordance with the current cooling requirement. In the illustrated preconditioned air unit, the variable frequency driver 46 keeps the ratio between the output voltage and the frequency substantially constant to maintain a high motor torque throughout the entire output frequency range.

The output voltage and frequency supplied by the variable frequency driver 46 is controlled by the VFD-controller in a way well-known in the art of variable frequency drivers. Preferably, the VFD-controller is capable of controlling the variable frequency driver 46 to output a variable output frequency, e.g. ranging from 0 Hz to the maximum rated frequency of the compressor 38 whereby each of the compressors 38 supplied from a respective variable frequency driver 46 may be controlled for provision of variable cooling capacity.

Each of the self-contained cooling modules has temperature sensors (39 in FIG. 6) in electrical connection with the VFD-controller of the module 36 and mounted for sensing temperatures in the air flow up-stream and down-stream of the evaporator 44 and transmitting the sensed temperature values to the VFD-controller, and the VFD-controller controls the cooling capacity of the compressor 38 in response to the sensed temperatures.

Each of the self-contained cooling modules 36 operates continuously, i.e. the output voltage and frequency of the variable frequency driver 46 are adjusted to levels required by the compressor 38 in order for it to cool the airflow having interacted with the evaporator 44 substantially to the temperature setting. This increases the life time and decreases power consumption of the cooling modules 36 as compared to on/off control of the compressors 38.

The preconditioned air unit 10 further comprises two condenser fans 48 mounted across apertures in the side wall 50 for generation of condenser airflow causing ambient air to enter the housing 12 through apertures in the self-contained cooling modules 36 covered by the condensers 40 as indicated by arrows 52a-52f for heat removal from the heat exchanging surfaces of the condensers 40.

The condenser fans 48 are powered from one variable frequency driver 54. Advantageously, the VFD controller of the variable frequency driver 54 is capable of varying the output voltage and frequency of the variable frequency driver 54 in order to control the condenser fans 48 in accordance with the current operational requirements, such as current pressure within the condenser(s), efficiency, etc. Preferably, the variable frequency driver 54 keeps the ratio between the output voltage and the frequency substantially constant to maintain a high motor torque throughout the entire output frequency range. The output frequency may range from 0 Hz to the maximum rated frequency of the condenser fans. The preconditioned air unit 10 further comprises a variable frequency driver 56 connected for electrical power supply of the blower 30. Advantageously, the VFD controller of the variable frequency driver 56 is capable of varying the output voltage and frequency of the variable frequency driver 56 in order to control the blower in accordance with the current operational requirements, primarily the amount of air allowed to be received in the type of aircraft currently connected to preconditioned air unit. Preferably, the variable frequency driver 56 keeps the ratio between the output voltage and the frequency substantially constant to maintain a high motor torque throughout the entire output frequency range. Preferably, the controller of the variable frequency driver 56 is capable of controlling the variable frequency driver 56 to output a variable output frequency, e.g. ranging from 0 Hz to the maximum rated frequency of the blower whereby the blower 30 supplied from the variable frequency driver 56 may be controlled for provision of variable flow rate of the air flow in the flow duct 20, e.g. in response to a user control command, e.g. the type of aircraft.

The preconditioned air unit 10 has a central controller 60 that is configured for controlling the operation of the preconditioned air unit 10. The central controller 60 is connected with the user interface panel 58 for reception of user commands and for outputting messages to the user, e.g. on a display of the user interface panel 58, by a loudspeaker of the user interface, etc.

The central controller 60 is connected with all of the VFD-controllers of the preconditioned air unit 10 for individual control of the VFD-controllers. For example, the central controller outputs an individual temperature setting to each of the VFD-controllers of the preconditioned air unit 10, and, in response to the individual temperature setting, each of the VFD-controllers controls the cooling capacity of the respective compressor 38 to adjust the temperature of the airflow having interacted with the corresponding evaporator 44 as required. Further, in the event that one of the installed self-contained cooling modules 36 fails, the failing cooling module transmits a failure signal to the central controller 60 and shuts down if required. In response to the failure signal, the central controller 60 operates to automatically adjust the required amount of cooling among the remaining properly operating self-contained cooling modules 36 of the preconditioned air unit 10.

Figure 6:
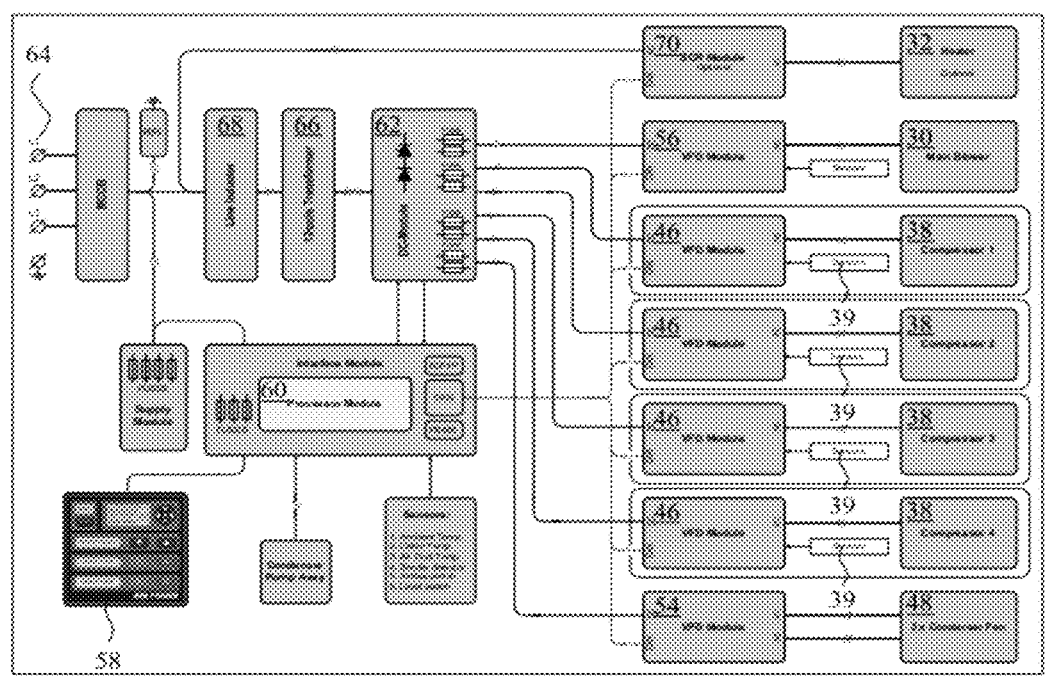
FIG. 6 is a block diagram showing the electrical interconnections of various modules and subassemblies of the preconditioned air unit.

FIG. 6 is a block diagram showing the electrical interconnections of various modules and subassemblies of the preconditioned air unit 10.

The illustrated preconditioned air unit 10 has a 12-pulse rectifier 62 connected to a mains supply input 64 of the preconditioned air unit 10 for generation of a power DC voltage supply. Using variable frequency drivers may generate harmonic distortion of the mains input. To minimize distortion of the mains input, the three phases of the mains are transformed into six phases which are rectified in the non-regulated 12-pulse full bridge rectifier 62. The combination of the 12-pulse rectifier 62, the related transformer 66 and the input filter 68 reduce harmonic feedback into the mains to a minimum. Further, the 12-pulse rectifier 62 includes soft start circuitry that limits the inrush current. Still further, utilization of the 12-pulse rectifier 62 results in a high input power factor, i.e. a power factor that is larger than 0.8; for example 0.96, which in turn results in a reduced input mains current.

The filtered power DC voltage supply is routed to each of the compartments 34 for power supply of each of the variable frequency drivers 46 of the self-contained modules 36 when installed in the respective compartments 34.

The filtered power DC voltage supply is further routed to variable frequency driver 56 for power supply of the blower 30 and to variable frequency driver 54 for power supply of the two condenser fans 48.

The central controller 60 is based on a micro-controller and a digital signal processor that cooperate to regulate, supervise and diagnose possible external and internal failures. In addition, each variable frequency driver 46, 54, 56 comprises a micro-controller to perform individual control of devices connected to the variable frequency driver in question. Further, the VFD-controller of each of the self-containing cooling modules 36 monitors the respective refrigeration system and decreases the cooling capacity or stops cooling if the refrigerant pressure is too low or too high.

The central controller 60 automatically adjusts the cooling performed by the preconditioned air unit 10 to the selected type of aircraft, the ambient temperature, the humidity, the cabin temperature, the outgoing airflow from the preconditioned air unit 10, etc.

The central controller 60 and the variable frequency drivers 46, 54, 56, and the SCR module 70 controlling the heater 32 are interfaced with a data and control bus, which in the illustrated example is the CAN bus.

The preconditioned air unit 10 may share a mains power outlet with other equipment at the parked aircraft, such as a ground power unit, a cable coil, vehicle battery chargers, etc. In order to lower the peak power requirement of the shared mains power outlet, the preconditioned air unit 10 comprises a power sharing control input (not shown) for control of preconditioned air unit 10 power consumption. The power sharing control input may for example be operated to lower the preconditioned air unit 10 power consumption during high load operation of the ground power unit, e.g. by lowering the cooling capacity provided by the preconditioned air unit 10 during high load ground power unit operation The ground power unit typically only operates at maximum load during a short period of time before push back from the gate until it is disconnected from the air craft at which point in time the aircraft's own air conditioning system takes over. Before then, the passenger cabin of the aircraft has already been cooled for some time and thus, lowering the cooling capacity for a short period of time before push back does not seriously diminish the overall performance of the preconditioned air unit 10. In general, lowering the cooling capacity for short periods of time does not seriously diminish the overall performance of the preconditioned air unit 10.

Figure 7:
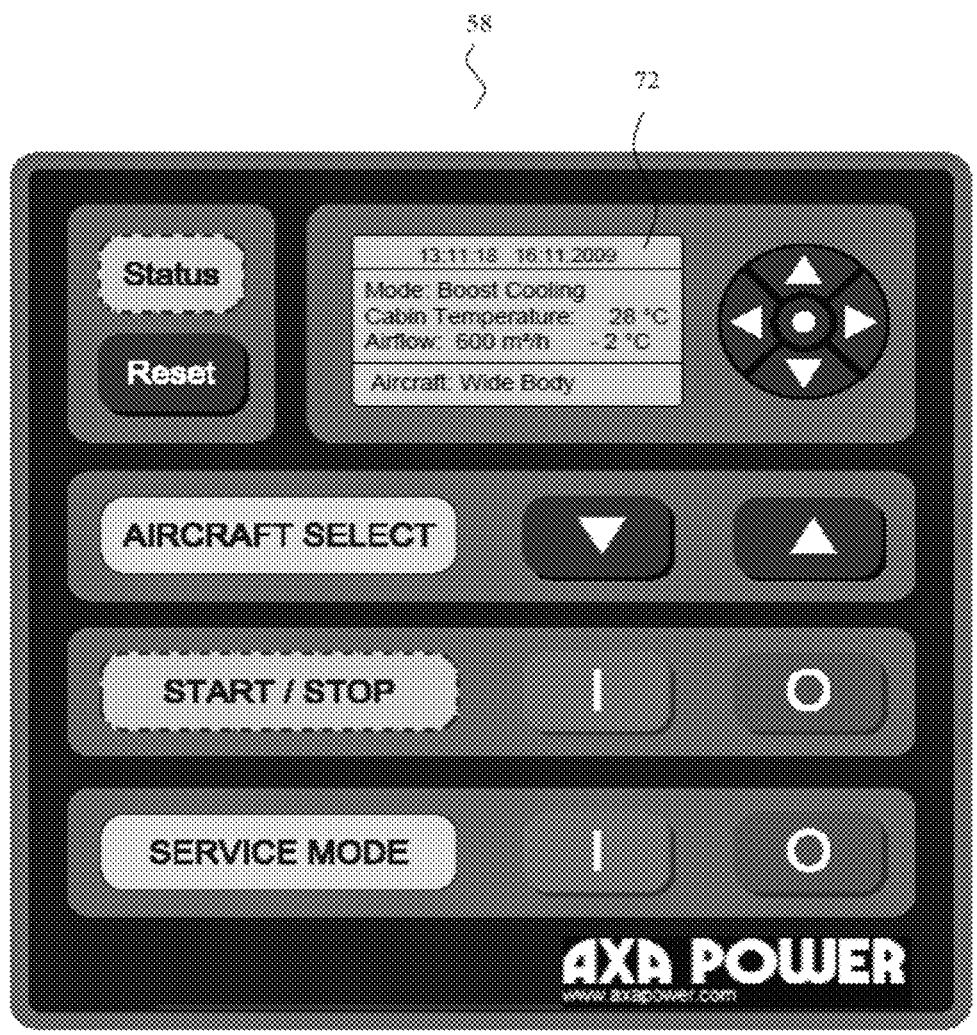
FIG. 7 shows the user interface panel of the preconditioned air unit.

FIG. 7 shows the user interface panel 58 of the preconditioned air unit 10. The user interface panel 58 includes an LCD display 72 viewable in all weather conditions and displaying all relevant operational data. The display provides information at different levels: In a default mode, the display shows the status of the preconditioned air unit 10, such as aircraft type, cabin temperature, etc. In an alarm mode, the display shows type of alarm and alarm history. In a setup mode, the display shows various parameters that may be adjusted.

The preconditioned air unit includes digital input/output ports, such as galvanic isolated RS485 port, TCP/IP Ethernet port, etc, for remote control of the preconditioned air unit 10 and monitoring including data dump for service tasks.

The preconditioned air unit 10 may be mounted underneath or on top of an apron drive bridge and move freely with bridge actuation. Alternatively, the preconditioned air unit 10 may be provided with pedestal legs for flexibility in preconditioned air unit location for fixed bridge and hangar applications.

Other preconditioned air units may be provided within the scope of the appended claims. For example, other preconditioned air units may be provided that are not modular. Also, preconditioned air units may be provided with different numbers of refrigeration systems, such as 1, 2, 3, 4, 5, 6, 7, 8, 9, 10, etc., refrigeration systems.

In the example illustrated in FIGS. 1, 2, 4, 5, and 6, the refrigeration systems operate in a series. Other preconditioned air units may be provided with refrigeration systems operating in parallel; or with refrigeration systems operating both in parallel and in series.

Figure 8:
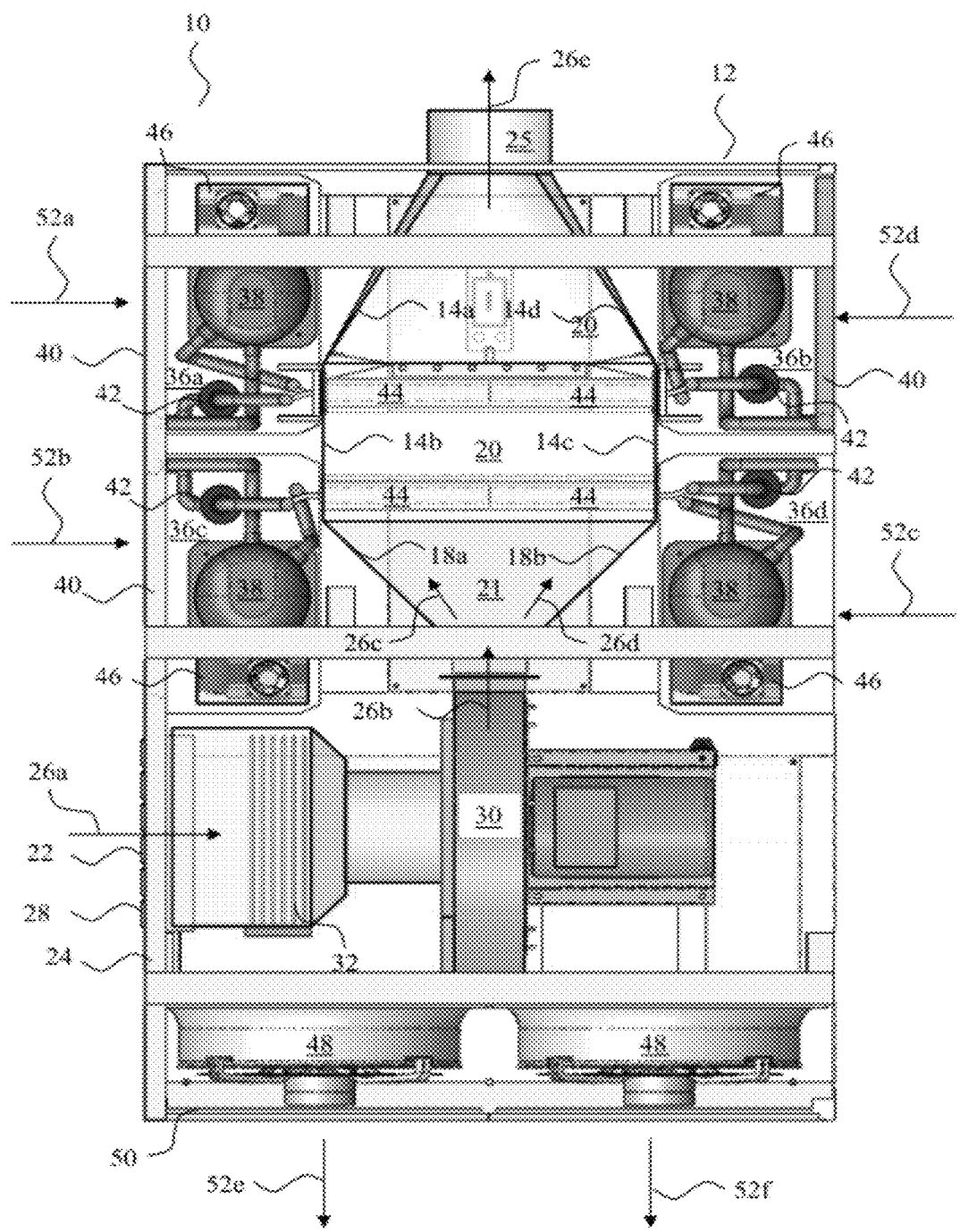
FIG. 8 shows another preconditioned air unit from above with the top removed.

For example, FIG. 8 shows a top view of a new preconditioned air unit 10 with two sets of self-contained cooling modules 36*a*, 36*b*, and 36*c*, 36*d*. Within each set, the self-contained cooling modules operate in parallel, and the two sets of self-contained cooling modules operate in series for supplying preconditioned air to an aircraft parked on the ground.

The preconditioned air unit 10 shown in FIG. 8 has a main unit with a housing 12 with walls 14*a*, 14*b*, 14*c*, 14*d*, 18*a*, 18*b* besides top and bottom walls (not shown) defining a flow duct 20. Ambient air enters through an air inlet 22 in a side wall 24 of the housing 12. Air is aspirated through an easily replaceable filter 28 that is mounted across the air inlet 22. An optional heater 32 is mounted at the air inlet 22 allowing the preconditioned air unit 10 to heat ambient air in case of low ambient air temperatures.

A blower 30 is connected with the flow duct 20 for generation of the required air flow from the air inlet 22 toward the air outlet 25. In the illustrated preconditioned air unit 10, the blower 30 is a highly efficient centrifugal fan. The blower 30 is mounted with vibration dampers and attached with flexible connections to the flow duct 20. The flow duct 20 is dimensioned for low air speed in order to prevent free moist carry-over.

The flow duct 20 has a manifold 21 for expanding the airflow for passage of the condensers 40 operating in parallel. The direction of the air flow is illustrated by arrows 26*a*, 26*b*, 26*c*, 26*d*, 26*e*. To prevent cooling losses, the outer walls 14*a*, 14*b*, 14*c*, 14*d*, 18*a*, 18*b* including the top wall of the flow duct are provided with a 50 mm thick layer of heat insulation material. At the bottom of the flow duct, heat insulation is provided underneath a plate (not shown) for collection of condensate.

The illustrated preconditioned air unit 10 has four similar compartments 34 for receiving and holding four respective self-contained cooling modules 36. It should be noted that parallel self-contained cooling modules to the left and right in FIG. 8 have different lay-outs with corresponding components positioned differently with respect to each other in order to obtain the resulting configuration illustrated in FIG. 8. Evaporator geometries of parallel operating self-contained modules also differ since the air flow passes the respective evaporators in opposite directions with respect to the refrigeration circuit.

The remaining components and the operation of the preconditioned air unit 10 illustrated in FIG. 8 are already explained in connection with the preconditioned air unit illustrated in the previous Figures and are not repeated here.

Figure 9:
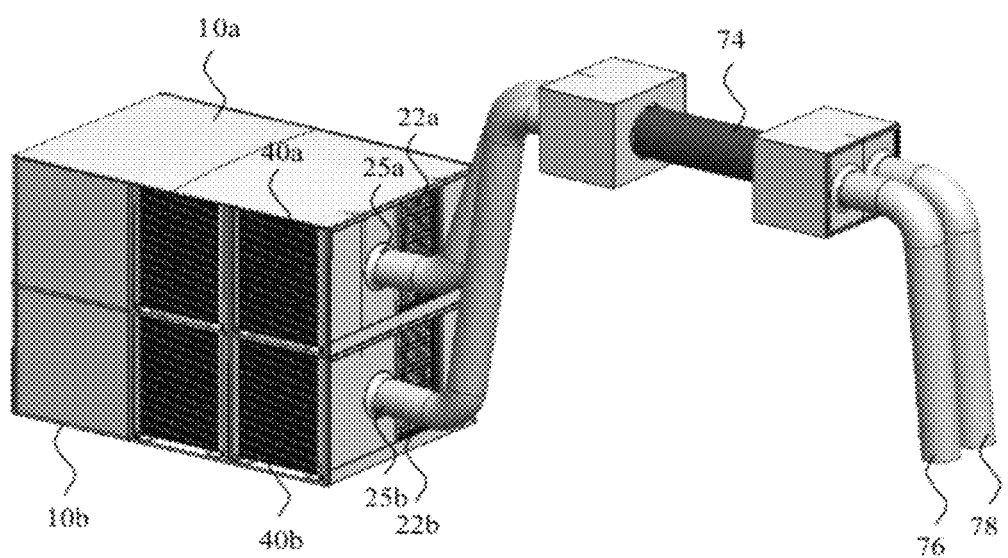
FIG. 9 shows two preconditioned air units coupled in parallel in a master-slave configuration.

FIG. 9 shows two of the new preconditioned air units 10*a*, 10*b* coupled in parallel in a master-slave configuration. The air outlets 25*a*, 25*b* of each of the preconditioned air units 10*a*, 10*b* are connected with a common hose 74. Proximate the parked aircraft, the common hose 74 is split into two hoses 76, 78 for supplying corresponding individual inputs of the aircraft for preconditioned air. The master 10*a* may control the slave 10*b* in such a way that the two preconditioned air units deliver substantially the same amounts of preconditioned air at substantially the same temperature to the parked aircraft.

The invention claimed is:

1. A preconditioned air unit for supplying preconditioned air to an aircraft parked on the ground, the preconditioned air unit comprising a housing accommodating a flow duct with an air inlet for ambient air and an air outlet for connection to the parked aircraft, a blower connected with the flow duct for generation of an air flow from the air inlet toward the air outlet, a plurality of refrigeration systems, each of which includes
   at least one compressor,
   at least one condenser,
   at least one expansion valve,
   at least one evaporator connected in a flow circuit containing a refrigerant, and wherein the at least one evaporator interacts with the air flow in the flow duct, and
   at least one variable frequency driver for power supply of the at least one compressor, and a central controller that is configured for controlling the operation of the preconditioned air unit including variable frequency drivers of the plurality of refrigeration systems,
   wherein the central controller has a power sharing control input for control of the preconditioned air unit power consumption.

2. A preconditioned air unit for supplying preconditioned air to an aircraft parked on the ground, the preconditioned air unit comprising a housing accommodating
   a flow duct with an air inlet for ambient air and an air outlet for connection to the parked aircraft,
   a blower connected with the flow duct for generation of an air flow from the air inlet toward the air outlet,
   a plurality of refrigeration systems, each of which includes
   at least one compressor,
   at least one condenser,
   at least one expansion valve,
   at least one evaporator connected in a flow circuit containing a refrigerant, and wherein the at least one evaporator interacts with the air flow in the flow duct, and
   at least one variable frequency driver for power supply of the at least one compressor, and
   a central controller that is configured for controlling the operation of the preconditioned air unit including variable frequency drivers of the plurality of refrigeration systems,
   wherein the central controller automatically adjusts the cooling performed by the preconditioned air unit according to at least one of: the selected type of aircraft, the ambient temperature, the humidity, the cabin temperature, or the outgoing airflow from the preconditioned air unit.

3. A preconditioned air unit according to claim 2, wherein the housing further accommodates at least one condenser fan positioned for generation of an airflow interacting with at least one of the condensers of the plurality of refrigeration systems.

4. A preconditioned air unit according to claim 2, wherein the housing further accommodates at least one variable frequency driver connected for power supply of at least one condenser fan for generation of an airflow interacting with at least one of the condensers of the plurality of refrigeration systems.

5. A preconditioned air unit according to claim 2, wherein the housing further accommodates a variable frequency driver connected for electrical power supply of the blower.

6. A preconditioned air unit according to claim 2, wherein at least one variable frequency driver has a controller that is configured for variation of the output frequency of the at least one variable frequency driver.

7. A preconditioned air unit according to claim 6, wherein the controller is configured for variation of the output frequency of the at least one variable frequency driver above the frequency of the mains supply of the preconditioned air unit.

8. A preconditioned air unit according to claim 6, wherein the controller is configured for variation of the output frequency of the at least one variable frequency driver above the frequency of the mains supply of the preconditioned air unit.

9. A preconditioned air unit according to claim 2, wherein the housing further accommodates a rectifier connected to a mains supply input of the air unit for generation of a power DC voltage supply.

10. A preconditioned air unit according to claim 9, wherein the rectifier is selected from the group consisting of a 12-pulse rectifier, an 18-pulse rectifier, and a 24-pulse rectifier.

11. A preconditioned air unit according to claim 2, further comprising at least one of: a user interface panel with input keys and a display, a remote control, a computer interface, a network interface, or a loudspeaker.

12. A preconditioned air unit according to claim 2, further comprising a heater in the flow duct.

13. A preconditioned air unit according to claim 2, wherein the central controller has a power sharing control input for control of the preconditioned air unit power consumption.

14. A preconditioned air unit according to claim 2, wherein each refrigeration system of the plurality of refrigeration systems is configured for failure detection so that, in the event that one of the refrigeration systems fails, the failing refrigeration system transmits a failure signal to the central controller.

15. A preconditioned air unit according to claim 2, wherein:
at least one variable frequency driver has a controller that is configured for variation of the output frequency of the at least one variable frequency driver;
the controller is configured for variation of the output frequency of the at least one variable frequency driver above the frequency of the mains supply of the preconditioned air unit;
at least one variable frequency driver is configured to keep the ratio between the output voltage and the frequency substantially constant;
each refrigeration system of the plurality of refrigeration systems is configured for failure detection so that, in the event that one of the refrigeration systems fails, the failing refrigeration system transmits a failure signal to the central controller; and
the central controller is further configured to automatically adjust the required amount of cooling among the remaining properly operating refrigeration systems of the plurality of refrigeration systems in response to the failure signal.

16. A preconditioned air unit for supplying preconditioned air to an aircraft parked on the ground, the preconditioned air unit comprising a housing accommodating
a flow duct with an air inlet for ambient air and an air outlet for connection to the parked aircraft,
a blower connected with the flow duct for generation of an air flow from the air inlet toward the air outlet,
a plurality of refrigeration systems, each of which includes
at least one compressor,
at least one condenser,
at least one expansion valve,
at least one evaporator connected in a flow circuit containing a refrigerant, and wherein the at least one evaporator interacts with the air flow in the flow duct, and
at least one variable frequency driver for power supply of the at least one compressor, and
a central controller that is configured for controlling the operation of the preconditioned air unit including variable frequency drivers of the plurality of refrigeration systems,
wherein each refrigeration system of the plurality of refrigeration systems is configured for failure detection so that, in the event that one of the refrigeration systems fails, the failing refrigeration system transmits a failure signal to the central controller.

17. A preconditioned air unit according to claim 16, wherein the central controller is further configured to automatically adjust the required amount of cooling among the remaining properly operating refrigeration systems of the plurality of refrigeration systems in response to the failure signal.

18. A preconditioned air unit according to claim 16, wherein at least one variable frequency driver has a controller that is configured for variation of the output frequency of the at least one variable frequency driver.

19. A preconditioned air unit according to claim 18, wherein the controller of the variable frequency driver is further configured for adjustment of the output frequency in response to a sensor output connected to the controller.

20. A preconditioned air unit according to claim 18, wherein the central controller is connected to at least one controller of at least one voltage frequency driver.

21. A preconditioned air unit according to claim 16, wherein at least one variable frequency driver keeps the ratio between the output voltage and the frequency substantially constant to maintain a high motor torque throughout the entire output frequency range.

22. A preconditioned air unit according to claim 16, wherein the central controller is further configured to automatically adjust the required amount of cooling among the remaining properly operating refrigeration systems of the plurality of refrigeration systems in response to the failure signal.

* * * * *